United States Patent [19]
Taherzadeh

[11] Patent Number: 5,797,348
[45] Date of Patent: Aug. 25, 1998

[54] FEED METHOD AND APPARATUS FOR FISH FARMS

[75] Inventor: Mesbah Taherzadeh, West Vancouver, Canada

[73] Assignee: Pacific Pool Water Products Ltd., Langley, Canada

[21] Appl. No.: 524,686

[22] Filed: Sep. 7, 1995

[51] Int. Cl.⁶ .................................................. A01K 61/00
[52] U.S. Cl. ........................... 119/230; 405/69; 119/223
[58] Field of Search ............................. 119/51.04, 223, 119/230, 233; 405/69

[56] References Cited

U.S. PATENT DOCUMENTS

| | | | |
|---|---|---|---|
| 3,641,770 | 2/1972 | Fitzgerald | 405/67 |
| 3,695,042 | 10/1972 | Denison | 405/67 X |
| 4,079,698 | 3/1978 | Neff et al. | 43/55 X |
| 4,248,547 | 2/1981 | Brown | 405/67 X |
| 4,351,269 | 9/1982 | Rines et al. | 119/233 |
| 4,886,015 | 12/1989 | Ochs . | |
| 4,957,064 | 9/1990 | Koma . | |
| 5,135,325 | 8/1992 | Eddy | 405/66 |
| 5,172,649 | 12/1992 | Bourgeois . | |
| 5,251,571 | 10/1993 | Willinsky et al. | 119/215 |
| 5,267,813 | 12/1993 | Neal | 405/72 |
| 5,299,530 | 4/1994 | Mukadam et al. | 119/223 |
| 5,310,283 | 5/1994 | Berg | 405/67 |
| 5,362,180 | 11/1994 | Canning et al. | 405/66 |

FOREIGN PATENT DOCUMENTS 1143362   3/1985   U.S.S.R. ................. 119/233

*Primary Examiner*—Robert P. Swiatek
*Attorney, Agent, or Firm*—Bull, Housser & Tupper

[57] ABSTRACT

An apparatus for feeding fish includes a member operable to be disposed in a body of water. The member has a wall for containing fish food and for defining a feeding area and the wall has upper and lower portions. The upper portion is operable to project above the surface of the water to generally protect the feeding area from wind to prevent feed in the feeding area from being blown by wind, yet provides access to the feeding area. The lower portion is operable to project sufficiently below the surface of the water to prevent the occurrence of opening between the wall and the surface of the after due to surface disturbances thereon, however, the lower portion does not project far enough below the surface to generally inhibit fish access to the feeding area.

30 Claims, 4 Drawing Sheets

5,797,348

FEED METHOD AND APPARATUS FOR FISH FARMS

BACKGROUND OF THE INVENTION

This invention relates to apparatus and methods for feeding fish at a fish farm.

Generally, a large percentage of the cost of fish in a fish farm is due to the amount of feed required to raise the fish to a harvestable size. Conventional methods of feeding fish involve dispensing generally floating fish food on the surface of a fish pen and hoping that all fish get enough to maintain their growth. However, such food is susceptible to the effects of wind which can blow it about the pen or perhaps into a corner, where fish are loath to go. Food left in an area where fish are loath to go can sit for a sufficient time to become saturated with water and sink. Furthermore, seabirds are apt to eat the untouched food. Consequently, a large percentage of the feed is wasted and the fish are deprived of food or excessive amounts of food must be provided to attain a desired growth, to compensate for wastage. It is estimated that approximately 40% of feed provided to fish in the conventional manner is wasted. The cost of producing farmed fish is nearly equal to the cost of the fish food and therefore, the cost of raising fish in a fish farm using conventional methods of feeding is excessive by about 40%. The present invention addresses this problem.

SUMMARY OF THE INVENTION

In accordance with one aspect of the invention, there is provided an apparatus for feeding fish including a member operable to be disposed on a body of water. The member has a wall for containing fish food and for defining a feeding area and the wall has upper and lower portions. The upper portion is operable to project above the surface of the water to generally protect the feeding area from wind to prevent food in the feeding area from being blown by wind, while providing access to the feeding area. The lower portion is operable to project sufficiently below the surface of the water to prevent the occurrence of openings between the wall and the surface of the body of water due to surface disturbances on the body of water, but does not project far enough below the surface to generally inhibit fish access to the feeding area.

Preferably, the member includes a fabric member having a first structural sleeve, a float sleeve, a second structural sleeve a web portion and a weight sleeve. The first and second structural sleeves are for receiving first and second structural members respectively for generally defining the ultimate shape of the fabric member, the float sleeve is for receiving and holding a float for creating buoyancy forces on the member, sufficient to cause the member to float on the body of water, and the weight sleeve is for receiving and holding a weight such that the web portion is tensioned between the float and the weight such that it is maintained fully extended.

Preferably the first structural sleeve and a portion of the float sleeve act as the upper portion of the wall and a portion of the float sleeve, the second structural sleeve, the web and the weight sleeve act as the lower portion of the wall.

Preferably, the float sleeve has a generally smooth surface portion facing the feeding area to deter accumulation of feed adjacent the float sleeve.

Preferably, the float is operable to cause the member to float on the water such that approximately ⅓ of the wall is above the surface of the water while the remainder of the wall is below the surface of the water.

Preferably, the first structural member includes a plurality of elongated members connected together to form a first ring.

In accordance with another aspect of the invention, there is provided a method of feeding fish in a body of water, the method comprising the steps of:

a) defining a feeding area with a wall disposed in the body of water;

b) dispensing generally floating fish feed into the feeding area;

c) generally protecting the feeding area from wind with an upper portion of the wall, the upper portion projecting above the surface of the water, to prevent feed in the feeding area from being blown by wind, while providing access to the feeding area; and d) preventing the occurrence of openings between the wall and the surface of the body of water due to surface disturbances on the body of water by causing a lower portion of the wall to project sufficiently below the surface of the water, but not far enough to generally inhibit fish access to the feeding area.

The upper portion of the wall defines a circular feeding area in which conventional floating fish food (not shown) may be dispensed onto the surface of the water, within the upper portion of the wall. The upper portion shelters the food from wind blowing across the water and any wind which does affect the food causes the food to move to a downwind portion of the upper portion. However, the wind also blows the apparatus which moves it about the water and relative to the floating feed, which generally prevents feed from accumulating at any particular portion of the upper portion.

The apparatus also acts to condition fish into seeking food within the circular feeding area, in other words it identifies the locating of the food within the body of water. Hence, the fish always know where to get food and therefore, more of the food is eaten by the fish. This leads to less waste and the use of less food which presents less cost to the fish farmer. Furthermore, because of the concentration of food caused by the apparatus, the fish can eat more in a given period of time, causing them to reach a harvestable size more quickly.

BRIEF DESCRIPTION OF THE DRAWINGS

In drawings which illustrates embodiments of the invention.

DETAILED DESCRIPTION

Figure 1:
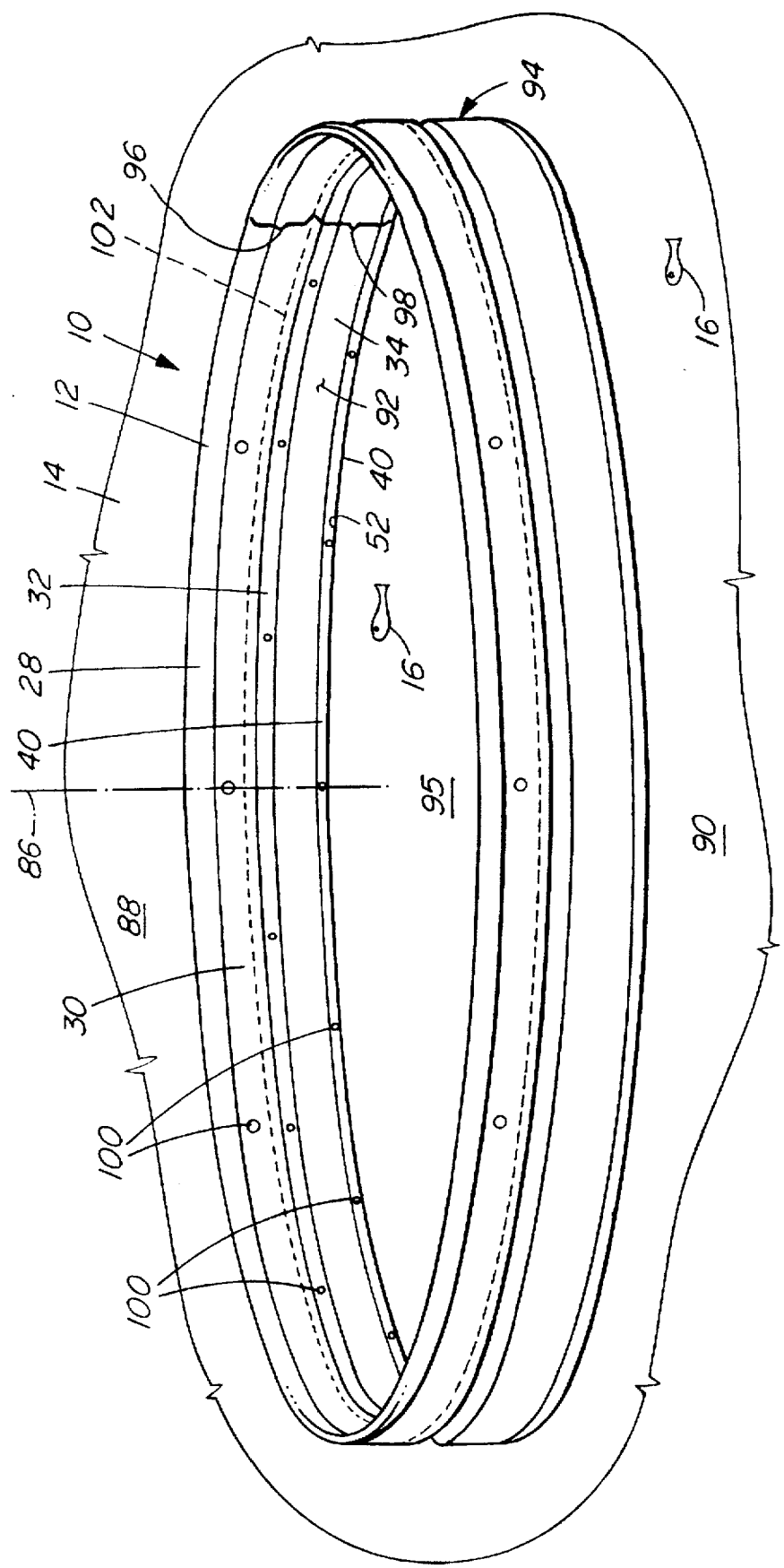
FIG. 1 is an oblique view of an apparatus according to a first embodiment of the invention.

Referring to FIG. 1, an apparatus for feeding fish in a fish farm, according to a first embodiment of the invention is shown generally at 10. The apparatus includes a sheet member 12 operable to be disposed on a body of water 14 in which fish 16 are contained. In the embodiment shown, the member 12 is a rectangular sheet of 18-ounce flexible supported or reinforced sheet plastic commonly known as vinyl having an ultra-violet light resistant coating.

Figure 2:
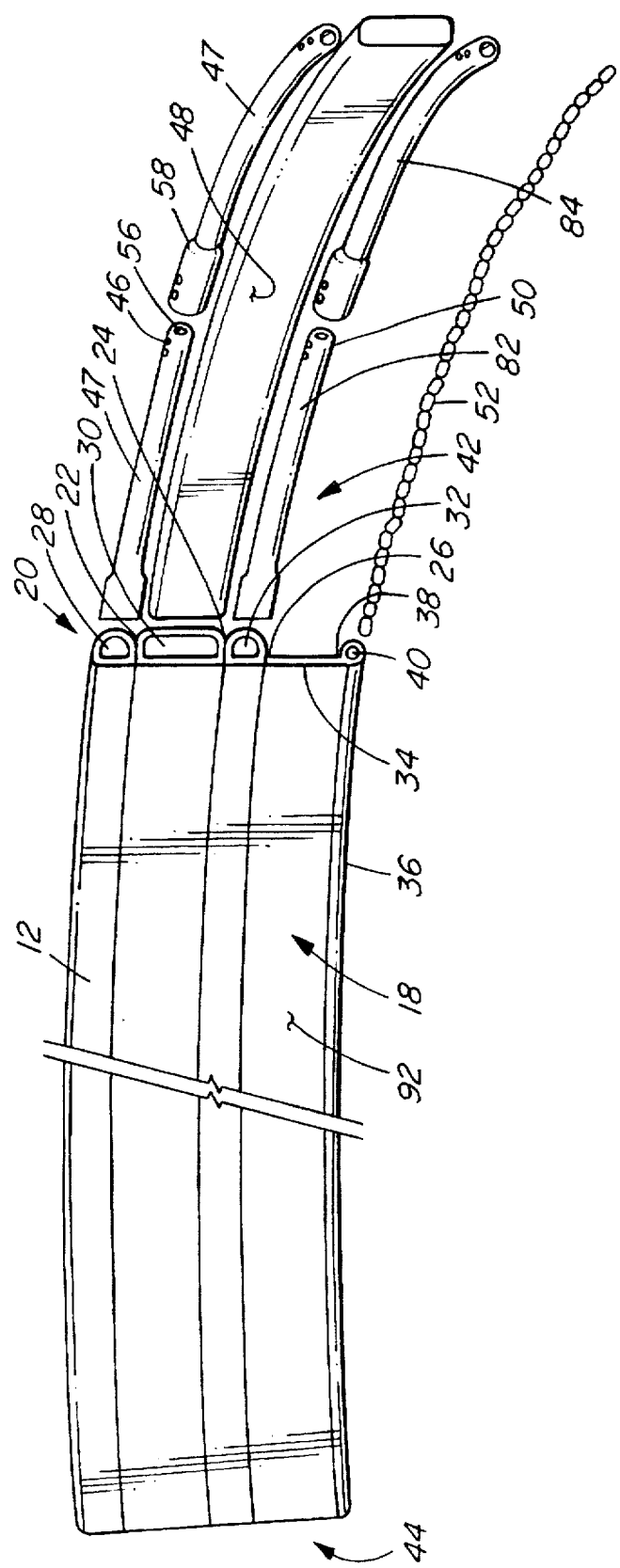
FIG. 2 is a broken, oblique view of the apparatus of FIG. 1 during assembly.

Referring to FIG. 2, to form the member 12 the rectangular sheet of vinyl is folded in half length-wise to form first and second folded portions shown generally at 18 and 20. The first and second folded portions 18 and 20 are electrically welded together lengthwise at first, second and third welds 22, 24, 26 to form a first structural sleeve 28, a float sleeve 30, and a second structural sleeve 32, in succession. A portion of the first folded portion extends below the second structural sleeve, forming a web portion 34. A longitudinal edge 36 of the first folded portion is further folded lengthwise and is welded at 38 to the web portion to form a weight sleeve 40 extending along the edge 36 of the member 12. Each of the sleeves 28, 30, 32, 40 extends the full length of the vinyl member 12 and each of the sleeves is open at each opposite end 42 and 44. Clearly, the sleeves 28, 30, 32 and 40 are generally parallel to each other. In this embodiment, the vinyl member is approximately 64 feet in linear length, measured from end 42 to end 44.

The first structural sleeve 28 is operable to receive a first structural member, a portion of which is shown at 46. The first structural member is generally operable to define the final shape of the vinyl member 12 when in use. The float sleeve 30 is operable to receive and hold a plurality of foam members which together act as a float, only one of such foam members being shown at 48. The second structural sleeve 32 is for receiving a second structural member, only a portion of which is shown at 50. The second structural member is further operable to generally define the final shape of the vinyl member. The web portion 34 is operable to extend beneath the second structural sleeve 32 when the apparatus is in use and the weight sleeve 40 is for receiving and holding a weight, which in this embodiment, includes a 64 foot length of 7 mm (approximately ¼ inch) chain 52.

FIG. 3

Figure 3:
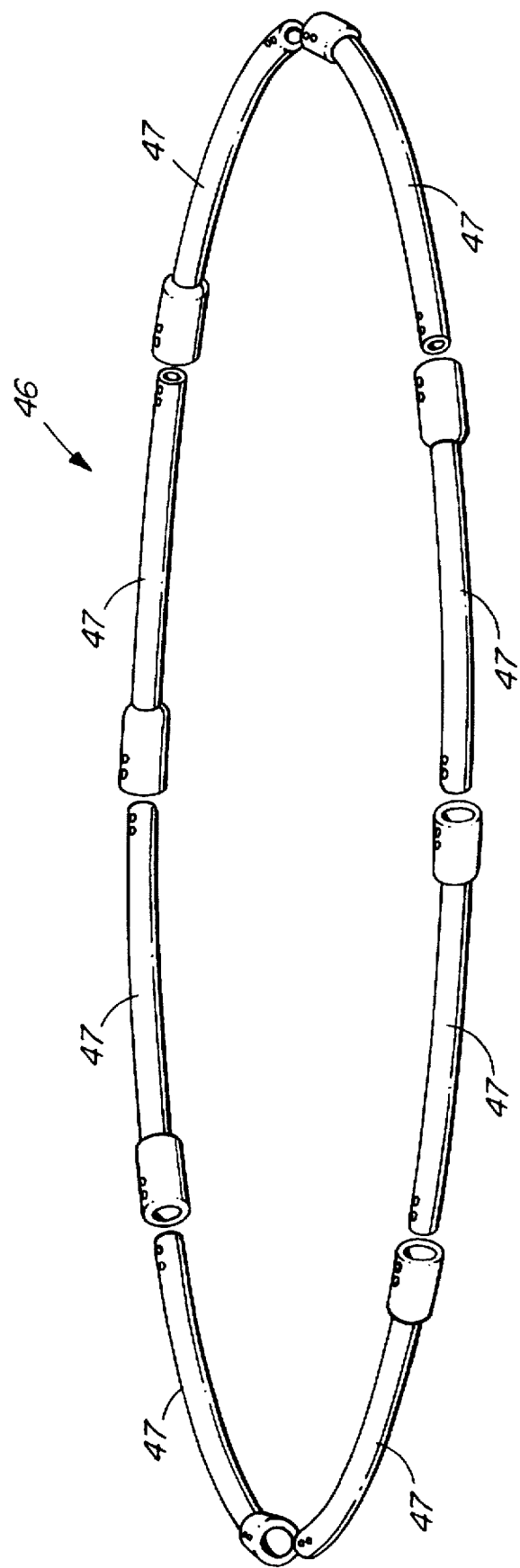
FIG. 3 is an oblique, exploded view of a structural member according to the first embodiment.

The first structural member 46 is shown in FIG. 3 and is formed from eight pre-curved 8-foot sections of conventional 1-inch ABS pipe sections 47 joined together in end-to-end relation to define a generally circular form having a diameter of approximately 20 feet.

FIG. 4

Figure 4:
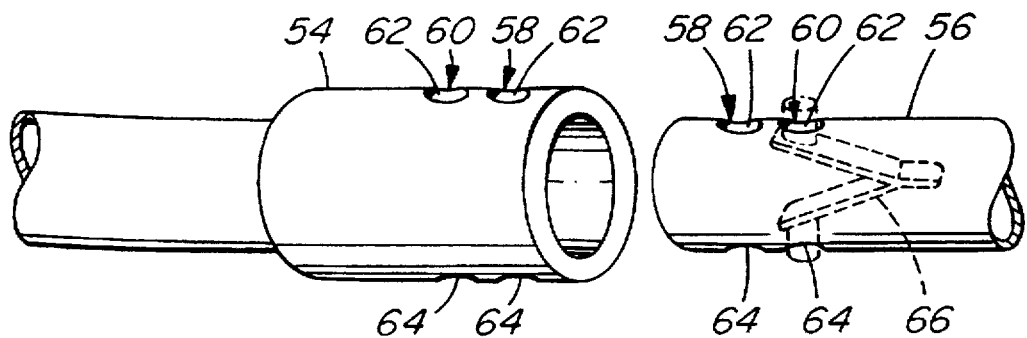
FIG. 4 is an oblique view of spigot and bell ends of respective pipes forming said structural member.

Referring to FIG. 4, to facilitate joining the pipe sections together, each pipe section has a bell end 54 and a spigot end 56, and each end has first and second pairs 58 and 60 of diametrically aligned openings 62 and 64 on diametrically opposite sides thereof. The first pair of openings 58 is disposed approximately one-inch from the respective end extremity of the pipe and the second pair 60 is disposed approximately two-inches from the respective end extremity.

FIG. 5

Figure 5:
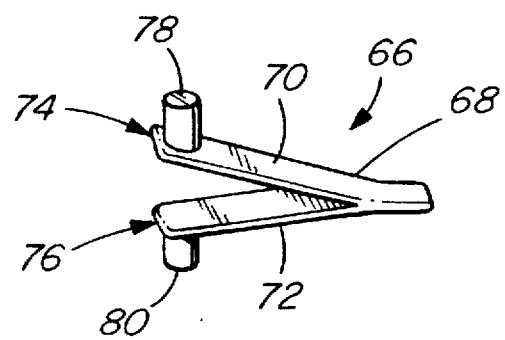
FIG. 5 is an oblique view of a retaining clip mounted in the spigot end of the pipe shown in FIG. 4.

Within the spigot end 56 of each pipe section 47 there is located a quick release connector 66 as shown in FIG. 5. The quick release connector is formed from a bent length of plastic 68 having first and second diverging resilient arms 70 and 72. Respective end portions 74 and 76 of the arms are fitted with respective pin portions 78 and 80 which generally project in diametrically opposite directions. A quick release connector is located at 66 in each spigot end 56 of each pipe, as shown in broken outline in FIG. 4. The connection is located such that the pins 78 and 80 are operable to project out of a desired pair of openings 58 or 60. Upon inserting a spigot end 56 into a bell end 54 of an adjacent pipe, the pins 78 and 80 are pressed into respective openings 62 and 64 in the spigot end 56 and spring outwardly when the openings 62 and 64 of a corresponding pair of openings 58 or 60 in the receiving bell end 54 are aligned therewith. This locks adjacent pipe sections together, requiring positive action in pressing the pins 78 and 80 together to permit the pipe sections to be separated. Thus, the quick release connectors 66 releasably secure adjacent pipe sections together.

Referring back to FIG. 2, in assembling the apparatus, each curved 8 foot pipe section 47 is successively placed into the first structural sleeve 28 with the spigot end 56 of each successive section being received in the bell end 54 of the pipe section succeeding it, whereby the pipe sections are connected together to form the first structural member 46 as shown in FIG. 3, within the first structural sleeve 28. When all pipe sections have been received in the first structural sleeve 28, the spigot end of the first inserted pipe section is accessible at the opposite end 44 of the sleeve and is inserted into the bell end of the last pipe section, whereby the circular form shown in FIG. 1 is generally defined.

Referring back to FIG. 2, at the same time as the first plurality of pipe sections 47 is inserted into the first structural sleeve 28, a second plurality of pipe sections only two of which are shown at 82 and 84, is similarly inserted into the second structural sleeve 32 to further define the shape of the resulting device as circular. The second plurality of pipe section is generally the same as those of the first plurality and is equally represented by FIG. 3.

At the same time the first and second pluralities of pipe sections are being inserted into their respective structural sleeves, a plurality of 8-foot long, one-inch thick and 12-inch wide rectangular, elongated parallelepiped foam members 48, of the flexible closed cell type are inserted into the float sleeve 30. In this embodiment, eight of such foam floatation members 48 are used, only one of which is shown in FIG. 2.

At the same time as the above components are being inserted into their respective sleeves, the chain 52 is inserted into the weight sleeve 40.

Referring back to FIG. 1, when all of the above components have been duly placed in their respective sleeves, the entire apparatus forms and maintains a closed circular loop shape about an axis 86. The resulting apparatus is placed on the surface of the body of water 14 such that the first structural sleeve 28 is uppermost and the weight sleeve 40 is lowermost and such that the axis 86 is generally perpendicular to the surface of the water 14. The float members 48 create buoyancy forces on the vinyl member 12, the buoyancy forces being sufficient to cause the member 12 to float on the body of water 14. The apparatus thus appears as a ring on the surface of the water, having open top and bottom portions 88 and 90.

Referring to FIGS. 1 and 2, the vinyl member 12 has an inside facing surface portion 92 which is smooth to prevent the accumulation of feed adjacent the float sleeve 30 which could otherwise occur if any radially inwardly extending projections or discontinuities were present. Rather, the inside facing surface portion is smooth and continuous. The vinyl member 12 thus acts as a wall 94 defining a feeding area 95. The first structural sleeve 28 and an upper portion of the float sleeve 30 lie above the surface of the water 14 while a lower portion of the float sleeve 30, the web portion 34 and the weight sleeve 40 lie below the surface of the water 14. The first structural sleeve 28 and the upper portion of the float sleeve 30 thus act as an upper portion 96 of the wall and a lower portion of the float sleeve 30, the web portion 34 and the weight sleeve 40 act as a lower portion 98 of the wall 94.

Preferably, the float members 48 are operable to cause the member 12 to float on the water 14 such that approximately one-third of the wall 94 is above the surface of the water while the remainder of the wall 94 is below the surface of the water. In other words, the lower portion 98 projects twice as far into the water as the upper portion 96 projects out of the water.

The upper portion 96 projects above the surface of the water 14 to generally protect the feeding area 95 from wind to prevent feed in the feeding are 95 from being blown by wind, while at the same time providing feed supply access to the feeding area. Preferably, the upper portion 96 extends approximately 9-10 inches above the surface of the water 14.

The lower portion 98 projects approximately 20 inches below the surface of the water 14. The chain 52 in the weight sleeve 40 acts as a weight which tends to cause the web portion 34 to be tensioned between the weight sleeve 40 and the float sleeve 30 to maintain the web portion 34 fully extended axially and to maintain and stabilize the upper portion 96 in a generally vertical orientation, above the surface of the water 14. The 20 inches the lower portion 98 extends beneath the surface of the water 14 is also sufficient to prevent the occurrence of openings between the wall 94 and the surface of the water 14 in the event of surface disturbances on the body of water, such as waves and swell. In other words, generally at least a portion of the lower portion 98 will always remain submerged. However, because the lower portion 98 only projects 20 inches beneath the surface, it does not project far enough below the surface to generally inhibit fish access to the feeding area 95. Thus, the lower portion 98 presents to hinderance to feeding.

When the apparatus is in use, it will be exposed to ultraviolet and infrared radiation from the sun. This may cause the vinyl member to expand relative to the structural members which could cause folds, creases or pleats to form on the side facing surface portion 92. Referring to FIG. 4, the first and second pairs of openings 58 and 60 on each pipe section permit the first and second structural members to be adjusted to take up any slack which may occur in the vinyl member 12. By locating the connector 66 in the first pair of openings 58 in the spigot end 56 and by inserting the spigot end into the bell end such that the pins 78 and 80 on the quick release connector 66 are received in the first pair of openings 58, the joint between the two pipe sections is set to its maximum length. Similarly, by positioning the quick release connector 66 to project in the second pair of openings 60 in the spigot end 56 and by causing the pins to be received in the second pair of openings 60 in the bell end 54, the joint between the two pipe section is set to its shortest length. Thus, the individual joints between each of the pipe sections can be selectively adjusted to add or subtract up to one inch of length at each joint. Therefore, overall the circumferential lengths may be selectively increased or decreased by up to eight inches. Therefore, the circumferences of the first and second structural members can be adjusted to maintain the vinyl member 12 taught.

It will be appreciated that the float sleeve 30, the second structural sleeve 32, and the weight sleeve 40 are partially or fully submerged when the apparatus is in use and are therefore able to become filled with water at opposite ends of the vinyl member 12. Therefore, drain openings 100 are provided in each of these sleeves to permit water to drain therefrom when the apparatus is removed from the water 14.

Referring to FIG. 2, it will further be appreciated that the apparatus may be easily assembled and disassembled. In its disassembled state, the vinyl member 12 may be folded into a compact size, the pipe sections 47 and floatation members 48 may be stacked, and the chain 52 may be packaged such that the apparatus occupies a minimum amount of space, certainly less space than it occupies when it is assembled as shown in FIG. 1. Thus the device may be shipped to a customer in a disassembled state and assembled by the customer relatively easily. Thus, the device is convenient to use.

Operation

In operation, the apparatus 10 floats on the body of water 14, as shown in FIG. 1. It displaces water up to a waterline as shown as 102, such that approximately ⅓ of the wall projects above the surface of the water while approximately ⅔ projects below the surface. The upper portion 96 of the wall 94 defines a circular feeding area 95 in which conventional floating fish food (not shown) may be dispensed onto the surface of the water 14, within the upper portion of the wall 94. The upper portion 96 shelters the food from wind blowing across the water 14 and any wind which does affect the food causes the food to move to a downwind area of the upper portion 96. However, the wind also blows the apparatus which moves it about the water and relative to the floating feed, which generally prevents feed from accumulating at any particular location along the upper portion.

The apparatus also acts to condition the fish 16 into seeking food within the circular feeding area 95, in other words it identifies the location of the food within the body of water. Hence, the fish always know where to get food and therefore, more of the food is eaten by the fish. This leads to less waste and the use of less food which presents less cost to the fish farmer. Furthermore, because the food is concentrated in the feeding area, the fish can eat more in a given period of time, causing them to reach a harvestable size more quickly.

While specific embodiments of the invention have been described and illustrated, such embodiments should be considered illustrative of the invention only and not as limiting the invention as construed in accordance with the accompanying claims.

What is claimed is:

1. A method of feeding fish in a body of water, the method comprising the steps of:
   (a) defining a feeding area with a wall disposed in said water, the area being essentially fully open to the atmosphere;
   (b) dispensing generally floating fish feed into said feeding area from above;
   (c) generally protecting said feeding area from wind with an upper portion of said wall projecting above the surface of the water, to prevent feed in said feeding area from being blown by wind, while providing access to said feeding area; and
   (d) reducing chances of openings occurring between said wall and the surface of said body of water due to surface disturbances on said body of water by causing a lower portion of said wall to project sufficiently below the surface of the water, but not enough to generally inhibit fish access to said feeding area.

2. A method as claimed in claim 1 further including the step of creating buoyancy forces on said wall, said buoyancy forces being sufficient to cause said wall to float on said body of water.

3. A method as claimed in claim 2 further including the step of causing said wall to float on the water such that approximately ⅓ of said wall is above the surface of the water while the remainder of said wall is below the surface of the water.

4. A method as claimed in claim 2 further including the step of receiving and holding a float in a float sleeve formed in a sheet member, said float sleeve having a portion forming at least a portion of said upper portion of said wall and a portion forming at least a portion of said lower portion of said wall.

5. A method as claimed in claim 4 further including the step of receiving and holding a first structural member in a first structural sleeve formed in said sheet member and defining the shape of said wall, with said first structural member, said first structural sleeve forming at least a portion of said upper portion of said wall.

6. A method as claimed in claim 5 further including the step of defining a ring shape in said wall, said feeding area being within said ring shape.

7. A method as claimed in claim 6 further including the step of tensioning a web portion of said sheet member between said float and a weight to extend said web portion beneath the surface of said water, said web portion forming a portion of said lower portion of said wall.

8. A method as claimed in claim 7 further including the step of receiving and holding a weight in a weight sleeve formed in said sheet member, said weight sleeve forming a portion of said lower portion of said wall.

9. An apparatus for feeding fish by providing a floating wall on a body of water to define a feeding area, the wall having upper and lower portions which respectively project above and below the surface of the water, the apparatus comprising:
(a) a generally flexible sheet member having a float sleeve forming at least a portion of said upper and said lower portions of the wall, and a first structural sleeve formed in at least a portion of said upper portion of said wall,
(b) a float received and held within said float sleeve to create buoyancy forces on said flexible sheet member sufficient to float on the water, and
(c) a relatively stiff first structural member received and held within said first structural sleeve, the first structural member being sufficiently stiff to define shape of the wall;
so that the upper portion of the wall can project sufficiently above the surface of the water to generally protect said feeding area from wind to restrict feed within said feeding area from being blown by the wind, while providing access to supply food to said feeding area; and the lower portion of the wall can project sufficiently below the surface of the water to reduce chances of openings occurring between said wall and surface of the water due to surface disturbances on the water, but not projecting sufficiently far below the surface to generally inhibit first access to said feeding area.

10. An apparatus as claimed in claim 9 wherein the wall has a loop form.

11. An apparatus as claimed in claim 9 wherein the wall has a ring form about an axis, said axis being generally perpendicular to the surface of the water when the apparatus is in use, said feeding area being bounded within said ring form.

12. An apparatus as claimed in claim 9 wherein said float is operable to cause said member to float on the water such that approximately ⅓ of said wall is above the surface of the water while the remainder of said wall is below the surface of the water.

13. An apparatus as claimed in claim 9 wherein the first structural member includes a plurality of elongated members connected together to form a first ring.

14. An apparatus as claimed in claim 13 wherein said elongated members include lengths of pipe connected together in end-to-end relation.

15. An apparatus as claimed in claim 9 wherein the sheet member includes a web portion operable to extend beneath the surface of said water, said web portion forming a portion of said lower portion of said wall.

16. An apparatus as claimed in claim 15 wherein the sheet member includes a weight for causing said web portion to be extended, the web portion being tensioned between said weight and said float when in use.

17. An apparatus as claimed in claim 16 wherein the sheet member includes a weight sleeve for receiving and holding said weight, said weight sleeve forming a portion of said lower portion of said wall.

18. An apparatus as claimed in claim 17 wherein said weight includes a length of chain operable to be received in said weight sleeve.

19. An apparatus as claimed in claim 17 in which:
(a) the weight sleeve is generally parallel to the first structural sleeve.

20. An apparatus as claimed in claim 9 wherein the sheet member includes a vinyl member, a portion of which acts as said wall.

21. An apparatus as claimed in claim 9 wherein the sheet member includes:
(a) a second structural sleeve for receiving a second structural member to generally define the shape of said sheet member, said second structural sleeve forming a portion of said lower portion of said wall;
(b) a web portion, said web portion forming a portion of said lower portion of said wall, and
(c) a weight sleeve for receiving and holding said weight, said weight sleeve extending along a lower edge of web portion and forming a portion of said lower portion of said wall.

22. An apparatus as claimed in claim 21 wherein said float sleeve has a generally smooth surface portion facing said feeding area to deter accumulation of feed adjacent said float sleeve.

23. An apparatus for feeding fish as defined in claim 9, in which:
(a) the flexible sheet member has a second structural sleeve having essentially continuous edge portions, and
(b) a relatively stiff second structural member is received and held in the second structural sleeve, the second structural member having sufficient stiffness to further define shape of said wall, said second structural sleeve forming a portion of said lower portion of said wall.

24. An apparatus as claimed in claim 23 wherein the second structural member includes a plurality of elongated members connected together to form a second ring.

25. An apparatus as claimed in claim 24 wherein said elongated members include lengths of pipe connected together in end-to-end relation.

26. An apparatus as claimed in claim 23 in which:
(a) the first and second structural sleeves are disposed adjacent upper and lower edges of the float sleeve respectfully.

27. An apparatus as claimed in claim 9 in which,
(a) the float sleeve and the first structural sleeve are generally parallel to each other.

28. An apparatus for feeding fish by providing a floating wall on a body of water to define a feeding area, the wall having upper and lower portions which respectively project above and below the surface of the water, the apparatus comprising:
(a) a generally flexible sheet member having a float sleeve forming at least a portion of said upper and said lower portions of the wall, and a first structural sleeve formed in at least a portion of said upper portion of said wall,
(b) a float received and held within said float sleeve to create buoyancy forces on said flexible sheet member sufficient to float on the water, and
(c) a first structural member received and held within said first structural sleeve to define shape of the wall, the first structural member including a plurality of elongated lengths of pipe connected together in end-to-end relation to form a first ring;

so that the upper portion of the wall projects sufficiently above the surface of the water to generally protect said feeding area from wind to restrict feed within said feeding area from being blown by the wind, while providing access to supply food to said feeding area; and the lower portion of the wall projects sufficiently below the surface of the water to reduce chances of openings occurring between said wall and surface of the water due to surface disturbances on the water, but not projecting sufficiently far below the surface to generally inhibit fish access to said feeding area.

29. An apparatus is claimed in claim 28, in which:
 (a) the flexible sheet member has a second structural sleeve, and
 (b) a second structural member is received and held within the second structural sleeve, the second structural member including a plurality of elongated members connected together to form a second ring.

30. An apparatus as claimed in claim 29 in which:
 (a) said elongated members of the second structural member include lengths of pipe connected together in end-to-end relation.

\* \* \* \* \*